US009876612B1

(12) United States Patent
Maveli et al.

(10) Patent No.: US 9,876,612 B1
(45) Date of Patent: Jan. 23, 2018

(54) DATA BANDWIDTH OVERHEAD REDUCTION IN A PROTOCOL BASED COMMUNICATION OVER A WIDE AREA NETWORK (WAN)

(71) Applicants: Naveen Maveli, Pleasanton, CA (US); Ashwath Nagaraj, Los Altos Hills, CA (US); Peter Yu, Fremont, CA (US)

(72) Inventors: Naveen Maveli, Pleasanton, CA (US); Ashwath Nagaraj, Los Altos Hills, CA (US); Peter Yu, Fremont, CA (US)

(*) Notice: Subject to any disclaimer, the term of this patent is extended or adjusted under 35 U.S.C. 154(b) by 0 days.

(21) Appl. No.: 15/424,902

(22) Filed: Feb. 6, 2017

(51) Int. Cl.
| | |
|---|---|
| *H04L 1/18* | (2006.01) |
| *G08C 25/02* | (2006.01) |
| *H04L 1/08* | (2006.01) |
| *H04L 5/00* | (2006.01) |
| *H04L 12/26* | (2006.01) |
| *H04L 1/16* | (2006.01) |

(52) U.S. Cl.
CPC .............. *H04L 1/08* (2013.01); *H04L 1/1642* (2013.01); *H04L 5/0055* (2013.01); *H04L 43/0829* (2013.01)

(58) Field of Classification Search
CPC .................. H04L 1/1816; H04L 1/188; H04L 2001/0093; H04L 2001/0097
See application file for complete search history.

(56) References Cited

U.S. PATENT DOCUMENTS

| 4,422,171 A | * | 12/1983 | Wortley | H04B 7/18513 |
| | | | | 375/E7.016 |
| 2003/0123403 A1 | * | 7/2003 | Jiang | H04L 1/1841 |
| | | | | 370/328 |
| 2009/0313519 A1 | * | 12/2009 | Nagaraja | H04L 1/0042 |
| | | | | 714/751 |
| 2012/0003940 A1 | * | 1/2012 | Hirano | H04W 74/0816 |
| | | | | 455/67.13 |
| 2013/0142049 A1 | * | 6/2013 | Jim | H04W 52/0225 |
| | | | | 370/241 |

* cited by examiner

*Primary Examiner* — Guy Lamarre
(74) *Attorney, Agent, or Firm* — Raj Abhyanker, P.C.

(57) ABSTRACT

A method of data bandwidth overhead reduction in a protocol based communication over a Wide Area Network (WAN) includes transmitting, through a sender device of a source location, data packets of a sequence to a receiver device of a destination location communicatively coupled to the sender device through the WAN and storing a copy of the transmitted data packets in the sender device for a first threshold duration of time. When the receiver device receives a non-consecutive data packet, the receiver device waits for a second threshold period of time before transmitting a NAK message to the sender device related to non-receipt of one or more out-of-order data packet(s). The sender device interprets the NAK message and retransmits the one or more out-of-order data packet(s) to the receiver device after which the one or more out-of-order data packets are removed.

20 Claims, 8 Drawing Sheets

FIGURE 8

DATA BANDWIDTH OVERHEAD REDUCTION IN A PROTOCOL BASED COMMUNICATION OVER A WIDE AREA NETWORK (WAN)

FIELD OF TECHNOLOGY

This disclosure relates generally to computer networking and, particularly, to a method, a system and/or a device for data bandwidth overhead reduction in a protocol based communication over a Wide Area Network (WAN).

BACKGROUND

Data packet communication over a Wide Area Network (WAN) may involve utilization of User Datagram Protocol (UDP) in one or more applications. These one or more applications (e.g., real-time gaming) may be particularly suited to UDP when delivery of all data packets is not critical. In certain other applications, to mitigate the effects of lossy communication, every data packet may be retransmitted from a source location to a destination location regardless of prior receipt thereof. However, this may cause usable data bandwidth to be cut in half.

SUMMARY

Disclosed are a method, a system and/or a device for data bandwidth overhead reduction in a protocol based communication over a WAN.

In one aspect, a method of reducing data bandwidth overhead includes transmitting, through a sender device of a source location, data packets of a sequence defined through a communication protocol to a receiver device of a destination location communicatively coupled to the sender device through a Wide Area Network (WAN), and storing, through the sender device, a copy of each transmitted data packet in a buffer thereof for a first threshold duration of time. The sender device is a server, a data processing device, a Point of Presence (POP) location of a computing system or a Customer Premise Equipment (CPE) associated with the source location. The receiver device is another server, another data processing device, another POP location of the computing system or another CPE associated with the destination location.

The method also includes storing, through the sender device, a copy of each transmitted data packet in a buffer thereof for a first threshold duration of time, and determining, through the receiver device, reception of a non-consecutive data packet of the sequence. The non-consecutive data packet has a sequence number non-continuous with a sequence number of an immediately previous data packet of the sequence received. Further, the method also includes starting, through the receiver device, a timer to wait for a second threshold duration of time to account for receipt of one or more out-of-order data packet(s) with a sequence number in a range between the sequence number of the immediately previous data packet of the sequence received and the sequence number of the non-consecutive data packet received.

Still further, the method includes transmitting, through the receiver device, a Negative Acknowledgement (NAK) message to the sender device upon non-receipt of the one or more out-of-order data packet(s) following completion of the wait for the second threshold duration of time along with an identifier thereof, interpreting, through the sender device, the NAK message from the receiver device based on the identifier received, retransmitting, through the sender device, the stored copy of the one or more out-of-order data packet(s) in the buffer to the receiver device upon the interpretation of the NAK message, and removing, through the sender device, the stored copy of the each transmitted data packet from the buffer for which no NAK message is received from the receiver device after the first threshold duration of time.

In another aspect, a system of reducing data bandwidth overhead includes a sender device of a source location, and a receiver device of a destination location communicatively coupled to the sender device through a WAN. The sender device is a server, a data processing device, a POP location of a computing system, or a CPE associated with the source location, and the receiver device is another server, another data processing device, another POP location of the computing system or another CPE associated with the destination location.

The sender device is configured to transmit data packets of a sequence defined through a communication protocol to the receiver device, and store a copy of each transmitted data packet in a buffer for a first threshold duration of time. The receiver device is configured to determine reception of a non-consecutive data packet of the sequence. The non-consecutive data packet has a sequence number non-continuous with a sequence number of an immediately previous data packet of the sequence received. The receiver device is also configured to start a timer to wait for a second threshold duration of time to account for receipt of one or more out-of-order data packet(s) with a sequence number in a range between the sequence number of the immediately previous data packet of the sequence received and the sequence number of the non-consecutive data packet received, and transmit a NAK message to the sender device upon non-receipt of the one or more out-of-order data packet(s) following completion of the wait for the second threshold duration of time along with an identifier thereof.

The sender device is further configured to interpret the NAK message from the receiver device based on the identifier received, retransmit the stored copy of the one or more out-of-order data packet(s) in the buffer to the receiver device upon the interpretation of the NAK message, and remove the stored copy of the each transmitted data packet from the buffer for which no NAK message is received from the receiver device after the first threshold duration of time.

In yet another aspect, a non-transitory medium, readable through a sender device of a source location and a receiver device of a destination location communicatively coupled to the sender device through a WAN and including instructions embodied therein that are executable through the sender device and the receiver device to reduce a data bandwidth overhead, is disclosed. The sender device is a server, a data processing device, a POP location of a computing system, or a CPE associated with the source location, and the receiver device is another server, another data processing device, another POP location of the computing system or another CPE associated with the destination location.

The non-transitory medium includes instructions to transmit, through the sender device, data packets of a sequence defined through a communication protocol to the receiver device, instructions to store, through the sender device, a copy of each transmitted data packet in a buffer thereof for a first threshold duration of time, and instructions to determine, through the receiver device, reception of a non-consecutive data packet of the sequence. The non-consecutive data packet has a sequence number non-continuous with a sequence number of an immediately previous data packet of the sequence received.

The non-transitory medium also includes instructions to start, through the receiver device, a timer to wait for a second threshold duration of time to account for receipt of one or more out-of-order data packet(s) with a sequence number in a range between the sequence number of the immediately previous data packet of the sequence received and the sequence number of the non-consecutive data packet received, instructions to transmit, through the receiver device, a NAK message to the sender device upon non-receipt of the one or more out-of-order data packet(s) following completion of the wait for the second threshold duration of time along with an identifier thereof, and instructions to interpret, through the sender device, the NAK message from the receiver device based on the identifier received.

Further, the non-transitory medium includes instructions to retransmit, through the sender device, the stored copy of the one or more out-of-order data packet(s) in the buffer to the receiver device upon the interpretation of the NAK message, and instructions to remove, through the sender device, the stored copy of the each transmitted data packet from the buffer for which no NAK message is received from the receiver device after the first threshold duration of time.

The methods and systems disclosed herein may be implemented in any means for achieving various aspects, and may be executed in a form of a machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of accompanying drawings, in which like references indicate similar elements and in which.

DETAILED DESCRIPTION

Example embodiments, as described below, may be used to provide data bandwidth overhead reduction in a protocol based communication over a Wide Area Network (WAN). It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
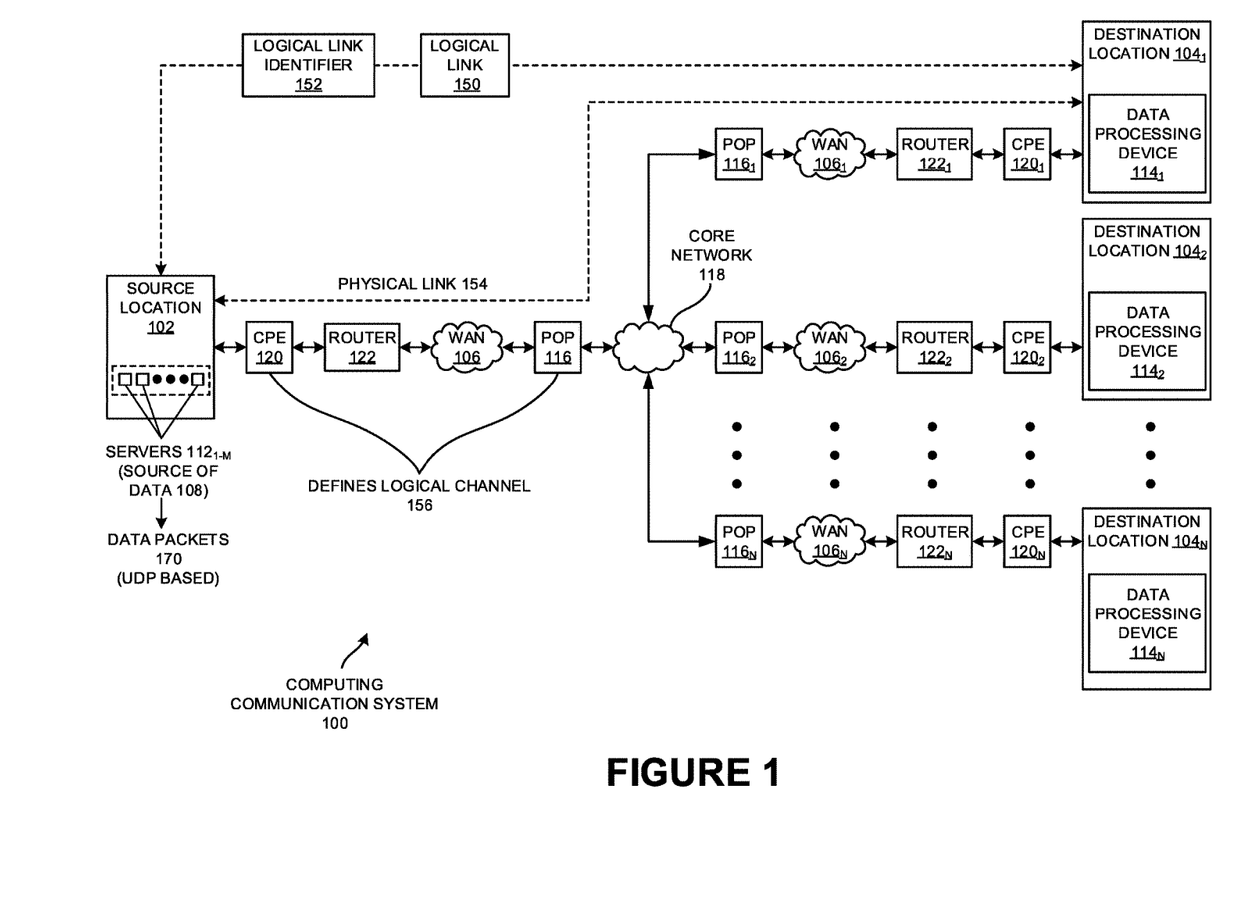
FIG. 1 is a schematic view of a computing communication system, according to one or more embodiments.

FIG. 1 shows a computing communication system 100, according to one embodiment. In particular, computing communication system 100 illustrates a source location 102 and a number of destination locations 104$_{1-N}$ communicatively coupled to one another through a computer network 106 (e.g., a Wide Area Network (WAN) 106 and WANs 106$_{1-N}$). In one or more embodiments, source location 102 (e.g., a head office of an entity 110 (e.g., a business entity)) may be a source of data 108 (e.g., multimedia data, text, video and/or audio data) to one or more of the number of destination locations 104$_{1-N}$. In one or more embodiments, source location 102 may include a number of data processing devices such as one or more server(s), computing device(s) and computing system(s) with associated storage. FIG. 1 shows a number of servers 112$_{1-M}$ as part of source location 102 for example purposes.

In the case of source location 102 being the head office, each of the number of destination locations 104$_{1-N}$ may be branch offices of entity 110. Again, it is obvious that the number of destination locations 104$_{1-N}$ may each also include one or more data processing device(s) such as one or more server(s), computing device(s) and computing system(s) with associated storage. FIG. 1 shows a data processing device 114$_{1-N}$ at each destination location 104$_{1-N}$ merely for example purposes.

It should be noted that a destination location 104$_{1-N}$ may serve as a source location and source location 102 may serve as a destination location in some scenarios. Further, destination location 104$_{1-N}$ may be a head office of entity 110 and source location 102 may be a branch office of entity 110. In one or more embodiments, a number of Point of Presence (POP) locations, POP 116 and POPs 116$_{1-N}$, may be present between source location 102 and the number of destination locations 104$_{1-N}$. FIG. 1 shows a correspondence between the number of WANs, WAN 106 and WANs 106$_{1-N}$, and the number of POPs, POP 116 and POPs 116$_{1-N}$, merely for example purposes. The aforementioned correspondence should not be considered limiting.

Each POP location discussed above may be an access point to the Internet. For example, the each POP location may be a physical location that house servers, routers, Asynchronous Transfer Mode (ATM) switches and/or digital/analog call aggregators. The each POP location may either be part of the facilities of a telecommunications provider that an Internet service provider (ISP) rents or a location separate from the telecommunications provider. The ISPs in computing communication system 100 may have multiple POP locations, sometimes numbering in the thousands. The POPs, POP 116 and POPs 116$_{1-N}$ may also be located at Internet exchange points and co-location centers.

Business entity 110 may include source location 102 (e.g., head office) and the number of destination locations $104_{1-N}$ (e.g., branch offices). The number of destination locations $104_{1-N}$ may be spread across different geographies (e.g., regions, countries). In one or more embodiments, WAN 106 and WANs $106_{1-N}$ between source location 102 and the number of destination locations $104_{1-N}$ may be enabled through a variety of networking protocols. In one or more embodiments, WAN 106 and WANs $106_{1-N}$ may be leased lines or Internet (e.g., egress/ingress only). In one or more embodiments, computing communication system 100 may include a core network 118 including a private network and/or a public network that utilizes WAN $106_{1-N}$ to communicate with POPs $116_{1-N}$. In one or more embodiments, core network 118 may also utilize WAN $106_{1-N}$ to communicate with external services (e.g., associated with service providers) and/or Content Delivery Networks (CDNs).

In one or more embodiments, source location 102 and the number of destination locations $104_{1-N}$ may securely share data 108 over WAN 106 and WANs $106_{1-N}$ through a private network using any of public addresses of source and destination routers, pools of addresses represented by a firewall, using a Multiprotocol Label Switching (MPLS) label, and using a Virtual Local Area Network (VLAN) tag. In one example embodiment, each data processing device $114_{1-N}$ (e.g., a desktop, a laptop, a notebook) at a corresponding destination location $104_{1-N}$ may be executing a client application such as Windows Explorer®, Microsoft® Word® and Internet Explorer® thereon and one or more open client connections to the number of servers $112_{1-M}$ at source location 102. In one or more embodiments, communication of data 108 between source location 102 and the number of destination locations $104_{1-N}$ may be accelerated using application acceleration services disclosed herein.

In one or more embodiments, POP 116 and POPs $116_{1-N}$ and optional Customer Premise Equipment (CPE), CPE 120 and CPE $120_{1-N}$, may perform protocol dependent proxy functions (e.g., singly or split across POPs and the optional CPEs) to resolve bandwidth limitation or to reduce communication times by simplifying the protocol or anticipating requests on behalf of users of the number of destination locations $104_{1-N}$. A combination of protocol dependent and protocol independent functions to solve bandwidth reduction and/or communication time reduction may be defined as application acceleration. Computing system 100 shown in FIG. 1 may provide application acceleration as a service.

It should be noted that the number of servers $112_{1-M}$ at source location 102 may, in one embodiment, be networked to one another through a Local Area Network (LAN). Similarly, in case of one or more destination locations $104_{1-N}$ including a number of data processing devices (e.g., data processing device $114_{1-N}$) therein, said data processing devices may also be communicatively coupled to one another through, for example, an internal LAN. In one or more embodiments, router 122 and routers $122_{1-N}$ may be networking device(s) that perform tasks of routing and forwarding information to destinations. For example, router 122 may communicate data 108 between source location 102 and WAN 106, and routers $122_{1-N}$ may communicate data 108 between WANs $106_{1-N}$ to the number of destination locations $104_{1-N}$.

In one or more embodiments, each of POP 116 and POPs $116_{1-N}$ may be a pool of servers providing WAN optimization and application acceleration (e.g., acceleration of data 108 as application data and/or an enterprise application associated with data 108). In one or more embodiments, POP 116 and POPs $116_{1-N}$ may be communicatively coupled to each other directly or indirectly through core network 118.

In one example embodiment, core network 118, WAN 106 and WANs $106_{1-N}$ may use leased lines and/or Internet.

In one or more embodiments, POP 116 and POPs $116_{1-N}$ may route the transport streams and/or the packet streams that includes data 108 on behalf of source location 102 from a closest POP (e.g., POP 116) thereto to a closest POP $116_{1-N}$ to a destination location $104_{1-N}$, and then onward to destination location $104_{1-N}$. In one or more embodiments, CPE 120 and CPE $120_{1-N}$ may be configured to perform secure transport of data 108 and communicate the secured data 108 to data processing devices/servers in the number of destination locations $104_{1-N}$ and source location 102, with optional intervening firewalls, through Internet Protocol Security (IPsec) tunnel, a Generic Routing Encapsulation (GRE) tunnel, VLANs, and MPLS labels using IP headers. In one or more embodiments, use of CPE 120 and CPE $120_{1-N}$ may enable resolving bandwidth limitation(s) in the first/last mile.

The first mile may be a link between the closest POP $116_{1-N}$ to a destination location $104_{1-N}$ and said destination location $104_{1-N}$. The last mile (e.g., also referred as second mile) may be a link between the closest POP 116 to source location 102 and source location 102. In one example embodiment, CPE $120_{1-N}$ may reduce communication time of data 108 in the link between the closest POP $116_{1-N}$ to a destination location $104_{1-N}$ and said destination location $104_{1-N}$ by resolving bandwidth limitation(s) in the first mile. CPE 120 may reduce communication time of data 108 in the link between the closest POP 116 to source location 102 and source location 102 by resolving bandwidth limitation(s) in the last mile.

In one or more embodiments, the use of CPE 120 and CPE $120_{1-N}$ may enable faster data communication to a destination location $104_{1-N}$ or source location 102 if the communication line has a low bandwidth. However, in one or more embodiments, if said destination location $104_{1-N}$ and source location 102 have sufficient bandwidth for data communication, the use of CPE 120 and CPE $120_{1-N}$ may not be required. In one example embodiment, storage in CPE 120 and CPE $120_{1-N}$ may be a flash memory device. In one or more alternate embodiments, CPE 120 and CPE $120_{1-N}$ may be coupled to or internally include other types of non-volatile storage devices that include hard drives, flash drives, solid state devices, etc.

In one or more embodiments, the use of POP 116 and POPs $116_{1-N}$ may eliminate the requirement of having intelligent synchronized WAN optimization equipment for solving latency and bandwidth at the ends of source location 102 and destination locations $104_{1-N}$. In addition, in one or more embodiments, the use of MPLS may be eliminated at core network 118 as POP 116 and POPs $116_{1-N}$ speed up data communication with no loss in packets and/or delay. In one or more embodiments, acceleration of data 108 may be possible as POP 116 and POPs $116_{1-N}$ are intelligently designed to analyze the destination of packets of data 108 and to communicate said packets to destination location(s) $104_{1-N}$ without compromising and/or modifying client private networks.

Figure 2:
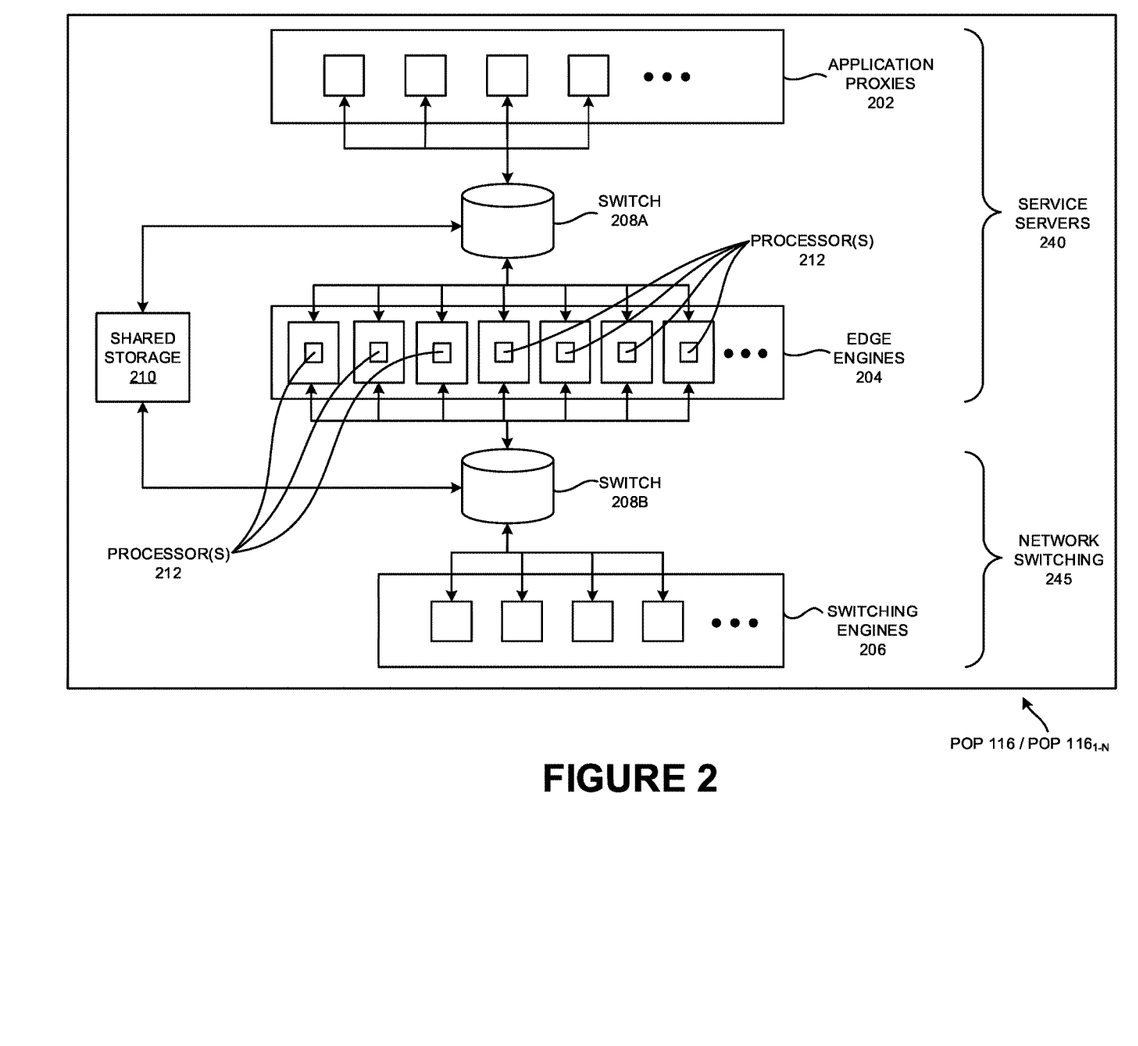
FIG. 2 is a schematic view of a Point of Presence (POP) device of FIG. 1, according to one or more embodiments.

FIG. 2 shows any of POP 116 and POPs $116_{1-N}$ (device form), according to one or more embodiments. In one or more embodiments, every engine of each of POP 116 and POPs $116_{1-N}$ may be scalable with load balancers. Also, in one or more embodiments, the engines of the each of POP 116 and POPs $116_{1-N}$ may enable sharing of resources among different customers thereof, thereby enabling multitenancy (e.g., multiple customers accessing the same hardware and software resources in the each of POP 116 and POPs 116$_{1-N}$).

In one or more embodiments, the each of POP 116 and POPs 116$_{1-N}$ may include a pool of servers providing application acceleration. In one or more embodiments, the each of POP 116 and POPs 116$_{1-N}$ may include application proxies 202 to implement and extend a number of protocols such as Common Internet File System (CIFS), Hypertext Transfer Protocol (HTTP), Messaging Application Programming Interface (MAPI), Simple Mail Transfer Protocol (SMTP), etc., edge engines 204 to perform WAN data redundancy removal, transparent object caching, IPsec/Secure Sockets Layer (SSL) security, POP stream shaping, POP-POP data encoding, etc., and switching engines 206 to perform POP-POP routing, Quality of Service (QoS), packet classification, stream shaping and load-balancing.

In one or more embodiments, the each of POP 116 and POPs 116$_{1-N}$ may include switches 208$_{A-B}$ to enable communication between application proxies 202, edge engines 204 and switching engines 206. In one embodiment, application proxies 202, edge engines 204 and switch 208$_A$ may function as service server 240. In one or more embodiments, the function as service server 240 may execute on one machine, or one process shared across customers or unique per customer. Service server 240 may provide QoS as packets are delivered based on priority order using application proxies 202 and edge engines 204 based on the type of data 108, application of data 108, security of data 108, etc.

Switch 208$_B$ and switching engines 206 may manage network switching 245. In one or more embodiments, network switching 245 may be the function(s) performed by switching engine(s) 206 to forward packets of data 108 through the network (e.g., WAN 106 and WANs 106$_{1-N}$). In one or more embodiments, POP 116 and POPs 116$_{1-N}$ may also have an optional storage device 210 to aid data redundancy removal and transportation. In one embodiment, storage device 210 may be a shared storage. In one or more embodiments, the any of POP 116 and POPs 116$_{1-N}$ may include a processor 212 to perform the functionalities described herein.

In one or more embodiments, data redundancy removal may include a class of techniques to remove duplicate information between senders and receivers by capturing histories of data streams and holding these histories beyond the life of connections. In one or more embodiments, POP 116 and POPs 116$_{1-N}$ may be shared among different clients and different branches. In addition, in one embodiment, the engines of POP 116 and POPs 116$_{1-N}$ may be shared by different clients. In one or more embodiments, POP 116 and POPs 116$_{1-N}$ may be centrally controlled through a control station. Also, in one or more other embodiments, POP 116 and POPs 116$_{1-N}$ may be controlled from distributed locations.

Figure 3:
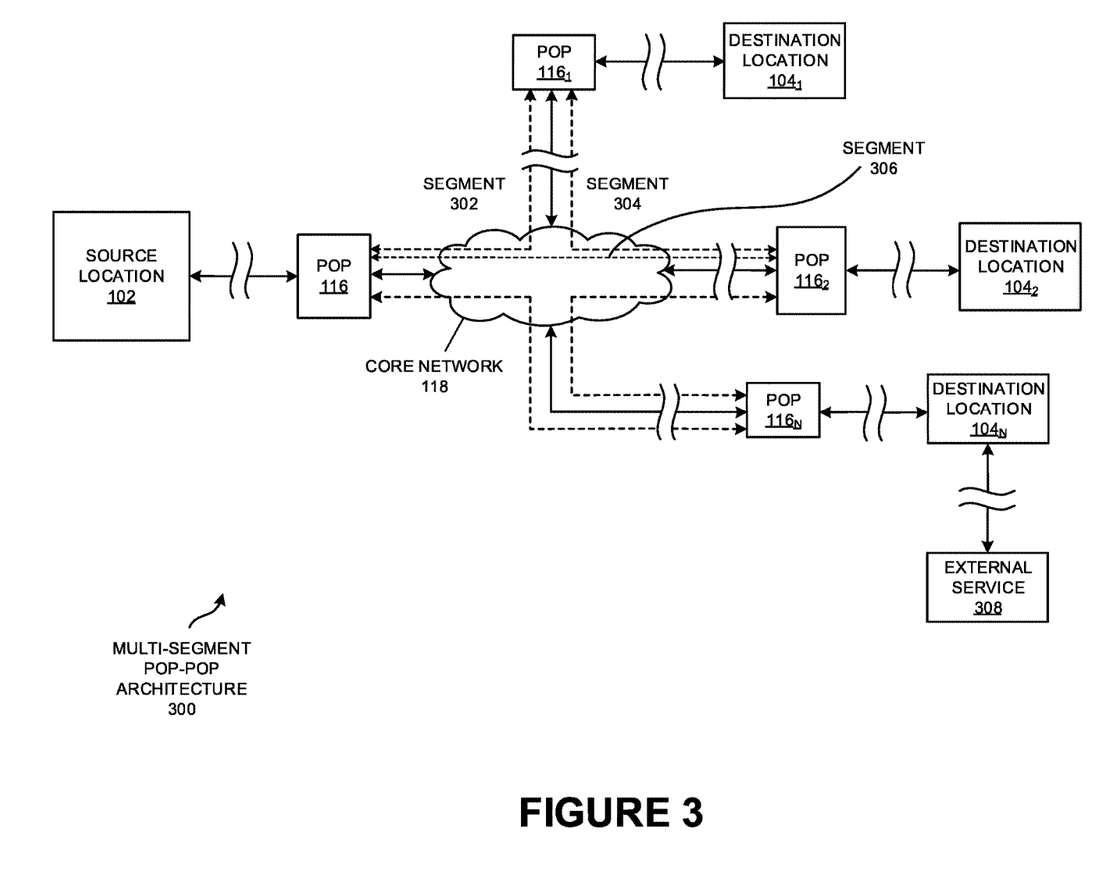
FIG. 3 is a schematic view of a multi-segment POP-POP architecture, according to one or more embodiments.

FIG. 3 is a system view illustrating a multi-segment POP-POP architecture 300, according to one or more embodiments. In one or more embodiments, POP 116 and POPs 116$_{1-N}$ may be installed in various geographical locations (e.g., around the country, around the world, etc.). In one or more embodiments, POP 116 and POPs 116$_{1-N}$ may be communicatively coupled to each other directly or indirectly through a public network or a private network. In one embodiment, POPs 116$_{1-N}$ may be installed "close" to locations of customer premises.

As an example, source location 102 may be Geneva, and destination location 104$_1$ and destination location 104$_2$ may be San Francisco (e.g., head office) and London respectively.

Here, POP 116 may be installed in Geneva, and POP 116$_1$ and POP 116$_2$ may be installed in San Francisco and London respectively. If the Geneva location requires transmission of large data (e.g., data 108) to the London location, then the Geneva location may directly communicate the data (e.g., data 108) to the London location without even going through the head office in the San Francisco location. The POP (e.g., POP 116) of the Geneva location may intelligently identify destination location 104$_2$ as London, thereby communicating the data (e.g., data 108) directly to the London POP (e.g., POP 116$_2$). The POP locations closest to source location 102 and/or destination locations 104$_{1-2}$ may be determined before traffic is sent (e.g., pre-provisioned) or when traffic is sent (e.g., dynamic). Intermediate POPs can also be determined via pre-provisioned or dynamic techniques. However, it should be noted that multi-segment POP-POP architecture 300 may also enable communication of the data (e.g., data 108) through the head office.

In one or more embodiments, a segment (e.g., segment 302) may be a communication link between a POP and other POPs, as shown in FIG. 3. For example, segment 302 may be an Internet or private point-point leased line. Policies may be assigned per segment. POP 116 and POPs 116$_{1-N}$ may be communicatively coupled to one other through transport network. As POP 116 and POPs 116$_{1-N}$ are communicatively coupled to one another directly/indirectly, there may be multiple segments (e.g., segment 304 and segment 306 are additionally shown for illustrative purposes). Therefore, the POP-POP architecture of the system may be called as multi-segment architecture.

In one or more embodiments, multi-segment POP-POP architecture 300 may enable each segment have different queuing and routing policies based on cost and congestion. In addition, multi-segment POP-POP architecture 300 may include Transmission Control Protocol (TCP) proxies (e.g., at layer 4) at each segment. Acknowledgements (ACKs) of TCP proxies are acknowledged by an immediately following segment, which may significantly reduce congestion issues and packet losses. Each segment may be configured with different TCP policies (e.g., windows scaling, Selective Acknowledgement (SACK), Additive Increase/Multiplicative Decrease (AI/MD), etc.) based on speed of link, congestion, peering points and customer preference. In addition, TCP policies may be controlled per protocol, per client. Furthermore, the TCP policies may be changed at runtime based on traffic conditions at each segment.

In one or more embodiments, multi-segment POP-POP architecture 300 may provide high availability (e.g., connectivity end-to-end). In an event of a POP failure (e.g., due to a network congestion, a service unavailability, a segment policy, etc.), multi-segment POP-POP architecture 300 may switch coupling to a different POP. In case of there being an intermediate POP failure, an alternate route may be determined based on which the data (e.g., data 108) is re-routed. Data re-routing may be well understood even in a label switched network. However, in multi-segment POP-POP architecture 300 with encryption and compression, the final destination may not be known unless the payload is inspected (and the payload is encrypted and compressed).

In one or more embodiments, multi-segment POP-POP architecture 300 may provide an out-of-band protocol that communicates the final destination address used for controlling the re-routing of the compressed/encrypted payload in the event of a POP failure. In an example embodiment, source location 102 in FIG. 3 may require communication with an external service 308. If the communication between POP 116 and POP 116$_1$ fails, then the communication from source location 102 may be routed via the POP 116$_2$. In the event of communication failure between POP 116 and the POP 116$_2$, the communication may be established by routing through another POP 116$_{3-N}$. It should be noted that features of application acceleration and/or WAN optimization such as variable compression per segment may be available through multi-segment POP-POP architecture 300.

Referring back to FIGS. 1 and 3, source location 102 and a destination location 104$_{1-N}$ of computing communication system 100/multi-segment POP-POP architecture 300 may be communicatively coupled over a logical link 150 identified through a logical link identifier 152, according to one or more embodiments. In one or more embodiments, logical link 150 may be a logical abstraction of a path traveled by data packets (e.g., of data 108) involved in a communication, and logical link identifier 152 may be an identifier of endpoints of logical link 150. In one embodiment, logical link identifier 152 may provide a signaling address for communication between source location 102 and destination location 104$_{1-N}$; it should be noted that source location 102 and/or destination location 104$_{1-N}$ may merely be POPs (e.g., POP 116, POP 116$_{1-N}$) in one embodiment.

It is obvious that a logical link 150 may involve multiple segments (e.g., segment 302, segment 304, segment 306); each segment of logical link 150 may be constructed from a physical link 154 and may include two segment endpoints. The capabilities of definition, generation and/or interpretation of logical links (e.g., logical link 150) and logical link identifiers (e.g., logical link identifier 152) may be built into CPEs (e.g., CPE 120 and CPE 120$_{1-N}$) and/or POPs (e.g., POP 116 and POPs 116$_{1-N}$). CPE 120 may be regarded as part of or associated with servers 112$_{1-M}$ and/or CPEs 120$_{1-N}$ may be regarded as part of or associated with data processing devices 114$_{1-N}$ in certain embodiments.

A User Datagram Protocol (UDP) frame may be a digital data transmission unit in computer networking within the TCP/IP protocol suite that is used in place of TCP when reliability of delivery is not required in multiple-segment POP-POP architecture 300. It should be understood that multi-segment POP-POP architecture 300 may include UDP proxies at each segment. Here, the UDP frame may be used by a CPE or a POP receiving a packet of data (e.g., data 108) to identify a particular physical link (e.g., physical link 154) on which said packet was transmitted. It is obvious that several policies related to load-balancing and/or replication may be defined in POPs (e.g., POP 116, POPs 116$_{1-N}$) and CPEs (e.g., CPE 120 and CPEs 120$_{1-N}$).

Figure 4:
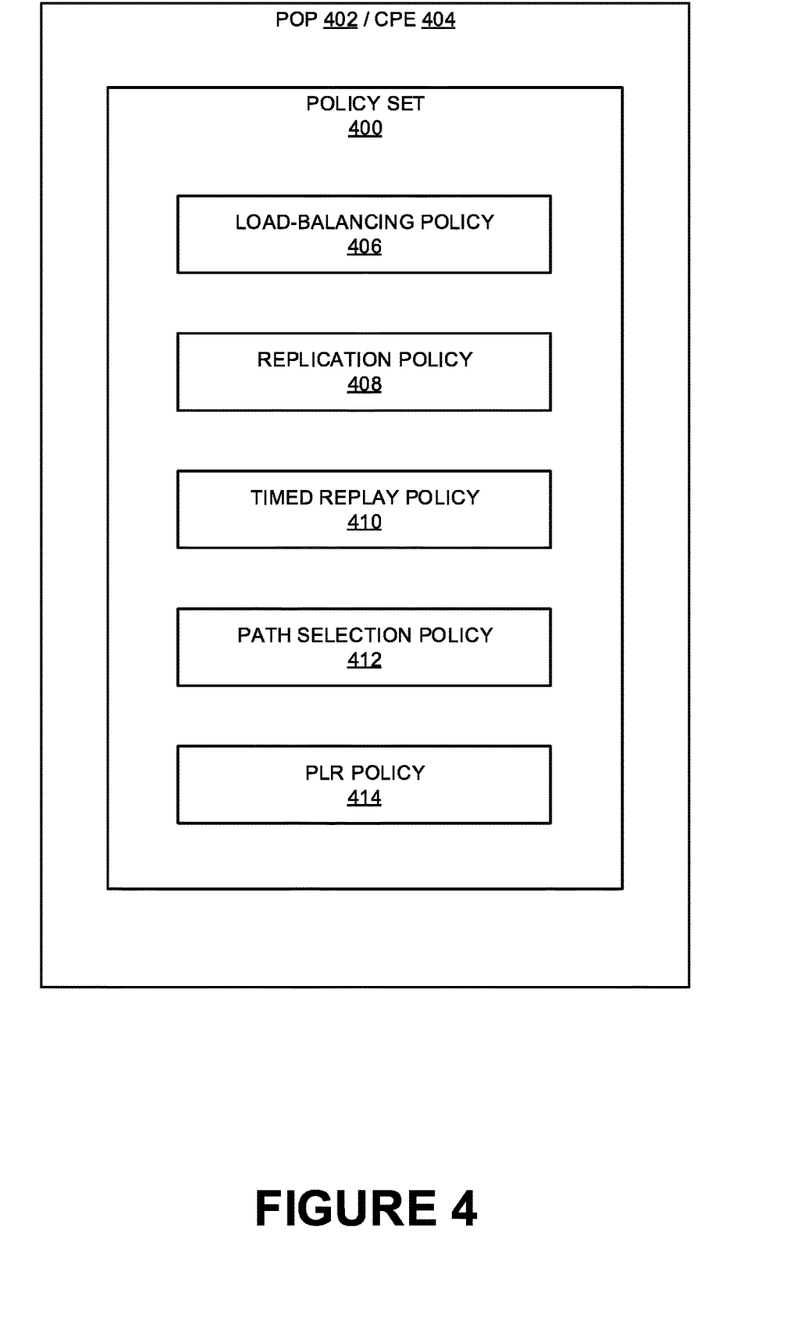
FIG. 4 is an illustrative view of a policy set defined in a POP or a Customer Premise Equipment (CPE) of FIG. 1, according to one or more embodiments.

FIG. 4 shows a policy set 400 defined in a POP 402/CPE 404 (e.g., POP 116, POPs 116$_{1-N}$, CPE 120, CPEs 120$_{1-N}$) for example purposes. Policy set 400 may, for example, include a load-balancing policy 406, a replication policy 408, a timed replay policy 410 and a path selection policy 412. Load-balancing policy 406 may enable selection of a particular physical link (e.g., physical link 154) to transmit a packet of data 108 (e.g., data packets 170 are shown in FIG. 1 as being associated with data 108; FIG. 1 also shown data packets 170 as UDP data packets for example purposes; in other words, data packets 170 and communication thereof are defined through UDP) from a first segment endpoint of a segment to the associated POP and/or the CPE located at a second segment endpoint of the segment of the logical link (e.g., logical link 150) based on an algorithm (e.g., a round robin algorithm).

Replication policy 408 may enable selection of at least two physical links over which to simultaneously transmit the packet and a copy thereof with respect to a segment of the logical link. Timed replay policy 410 may enable selection of a physical link over which to transmit the packet and scheduling of transmission of a copy of the packet within a predefined time of the transmission of the packet over the physical link. Path selection policy 412 may enable selection of a particular physical link to transmit the packet from a first segment endpoint of an associated segment of the logical link to an associated POP and/or the CPE located at a second segment endpoint of the associated segment based on a preferred path associated with a logical channel (e.g., encapsulated as a UDP frame).

Again, the capabilities of definition, generation and/or interpretation of logical channels (e.g., logical channel 156 of FIG. 1; logical channel 156 may be defined to transmit a data packet 170 over a physical link) may be built into CPEs (e.g., CPE 120 and CPE 120$_{1-N}$) and POPs (e.g., POP 116 and POPs 116$_{1-N}$). Again, CPE 120 may be regarded as part of or associated with servers 112$_{1-M}$ and/or CPEs 120$_{1-N}$ may be regarded as part of or associated with data processing devices 114$_{1-N}$ in certain embodiments.

In a typical implementation, impact of lossy edge links on UDP data streams (e.g., involving data 108) with respect to path selection and load-balancing may be mitigated through providing configured timed replay defined in timed replay policy 410. In accordance therewith, every data packet 170 may be transmitted to a destination location (e.g., destination location 104$_{1-N}$, POP 116$_{1-N}$, CPE 120$_{1-N}$) regardless of prior receipt thereof. However, by transmitting every data packet 170 twice, usable bandwidth may be cut in half. Exemplary embodiments provide for a feedback mechanism between POPs (e.g., POP 116 and POPs 116$_{1-N}$), between source location 102 and POP 116 and/or between a POP 116$_{1-N}$ and a destination location 104$_{1-N}$ as part of Path Loss Recovery (PLR) implemented as a policy (e.g., PLR policy 414 shown in FIG. 4) to determine the exact packets (e.g., of data packets 170) of data 108 lost during transmission; source location 102 (or, sender; this can also be POP 116 or POPs 116$_{1-N}$) may then be required to solely retransmit packets that are deemed to be lost (in other words, packets that did not reach the destination location); as a result, exemplary embodiments may only require an additional bandwidth proportional to loss percentages over the logical links.

In other words, PLR policy 414 may aim to achieve the same loss mitigation as timed replay policy 410 while reducing bandwidth overhead from a consistent total data bandwidth to a fraction thereof equal to the data loss percentage. In one or more embodiments, PLR policy 414 may allow for the feedback mechanism discussed above to be enabled or disabled. In one embodiment, the timed replay discussed above may automatically be disabled whenever the feedback mechanism (based on PLR) is enabled. In some embodiments, a logical channel may be switched back and forth to use PLR or timed replay based on whether traffic exceeds a configured threshold. In one or more embodiments, PLR may be configured on preferred path and load-balancing channels but may not be supported on path replication channels.

Figure 5:
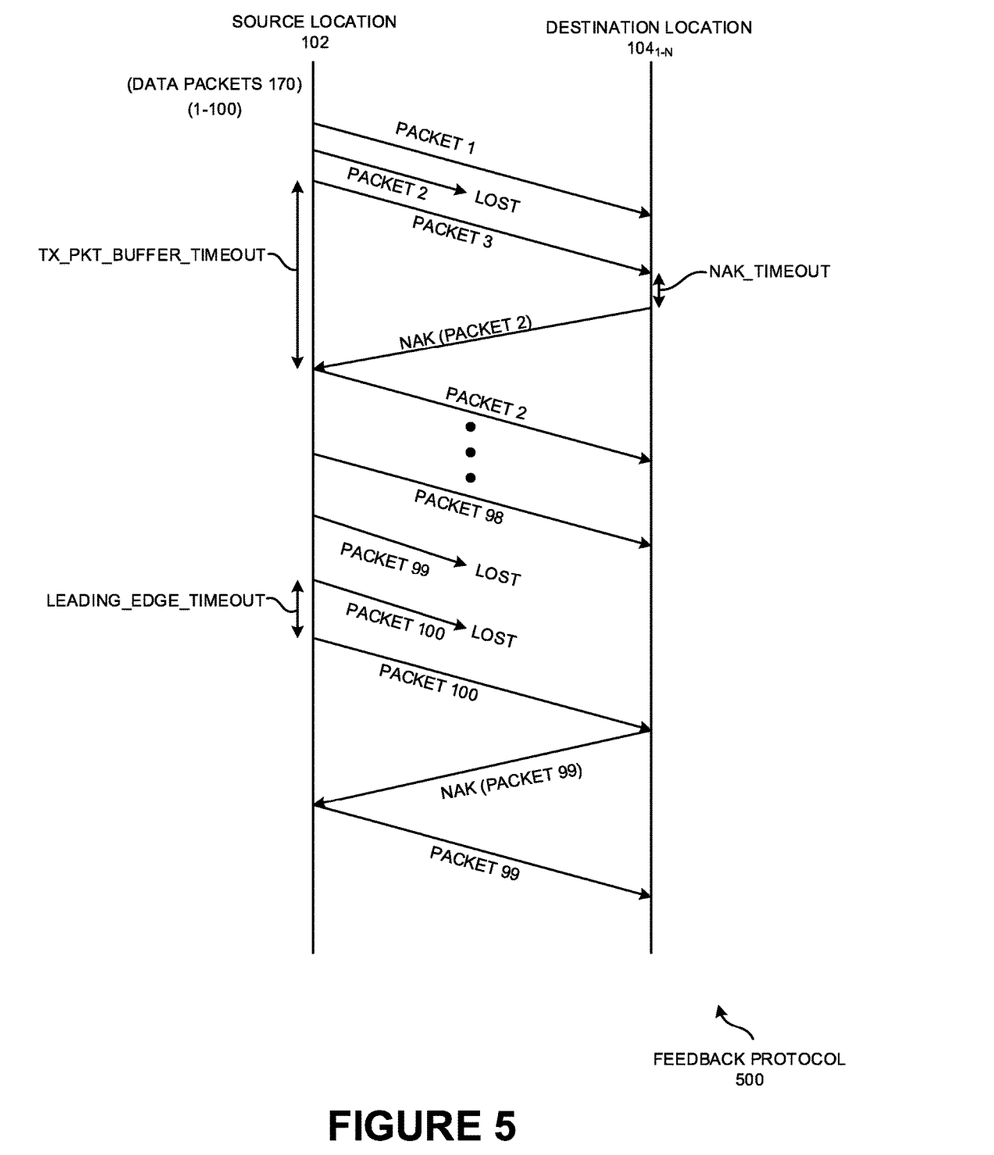
FIG. 5 is an illustrative view of a communication process implemented through a feedback protocol associated with Path Loss Recovery (PLR) in elements of the computing communication system of FIG. 1 and the multi-segment POP-POP architecture of FIG. 3.

FIG. 5 illustrates a communication process implemented through a feedback protocol 500 associated with the PLR, according to one or more embodiments. Transmission of 100 data packets 170 of a sequence is illustrated for example purposes. Data packet 1 may be successfully delivered from the sender (e.g., a CPE, servers $112_{1-M}$, a data processing device $114_{1-N}$ or a POP) to the receiver (e.g., again, a CPE, servers $112_{1-M}$, a data processing devices $114_{1-N}$ or a POP). Data packet 2 may be lost and not delivered to the receiver. The receiver may detect the loss of data packet 2 upon receipt of data packet 3, following which the receiver may wait for a threshold duration of time (e.g., NAK_TIMEOUT) before sending out a Negative Acknowledgement (NAK) to the sender to account for a possible late arrival of said data packet 2 due to reordering.

Unlike the timed replay discussed above, in one or more embodiments, the sender may retransmit an already transmitted packet one more time only upon non-receipt thereof by the receiver. In one or more embodiments, instead of ACKing the packets that have already been received, the receiver may NAK packets that the receiver interprets to be lost. In one or more embodiments, doing so may guarantee that feedback protocol 500 takes up no additional bandwidth on logical links except in case of lost packets.

Figure 6:
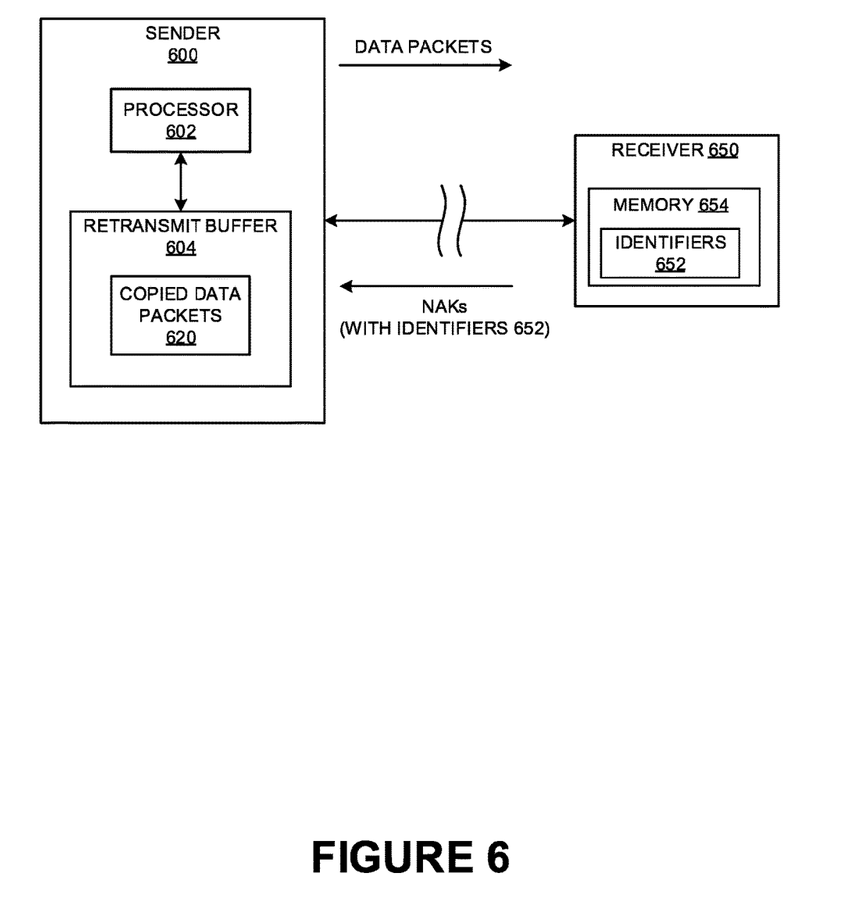
FIG. 6 is a schematic view of communication between a sender device and a receiver device of the computing communication system of FIG. 1 and the multi-segment POP-POP architecture of FIG. 3.

In one or more embodiments, feedback protocol 500 may function on a per-channel basis so that losses of one channel may be sufficiently isolated from other channels. FIG. 6 shows a sender 600 including a processor 602 and a retransmit buffer 604, and a receiver 650, according to one or more embodiments. Referring back to FIG. 5, after sender 600 transmits a data packet, sender 600 may copy the data packet and store said data packet in retransmit buffer 604 (e.g., copied data packets 620 is shown in retransmit buffer 604 in FIG. 6). In case of data packets 1 and 3 that are received at receiver 650, no NAKs may be sent to sender 600 therefrom; the copied data packets may be removed from retransmit buffer 604 after another threshold duration of time (e.g., TX_PKT_BUFFER_TIMEOUT).

In case of data packet 2 that is not received at receiver 650, TX_PKT_BUFFER_TIMEOUT may refer to the threshold duration of time for which data packet 2 is kept in retransmit buffer 604 prior to retransmission thereof to receiver 650. Upon receipt of a non-consecutive data packet 3, receiver 650 may wait for a time duration equal to NAK_TIMEOUT for data packet 2 to account for an out-of-order arrival. If data packet 2 does not arrive even after NAK_TIMEOUT, receiver 650 may transmit a NAK with respect thereto back to sender 600. Upon receipt of the NAK by sender 600 and interpretation thereof, sender 600 may retransmit data packet 2 and remove the copy thereof from retransmit buffer 650.

In one embodiment, for preferred path channels, NAKs may be transmitted over the active path; for load-balancing channels, NAKs may be transmitted over the path with lowest measured loss, for example, in the last 1-minute cycle. Feedback protocol 500 discussed above may work for a continuous stream of data packets 170, but in case the last several data packets in the stream (e.g., all the way to the 100th data packet) are not received, sender 600 may have no way to find out. In one or more embodiments, to solve the aforementioned problem, sender 600 may opportunistically retransmit the last packet transmitted to actively solicit a NAK after:

(1) sender 600 has not transmitted any data packet in yet another threshold duration of time (e.g., TX_LEADING_EDGE_TIMEOUT), and (2) sender 600 has not received any NAK from receiver 650 after TX_LEADING_EDGE_TIMEOUT.

With respect to the lost 99th and 100th data packet shown in FIG. 5, receiver 650 may transmit NAK for the 99th data packet with the relevant identifier (e.g., an identifier 652 stored in a memory 654 of receiver 600; it should be noted that all NAKs may have identifiers (e.g., identifier 652) associated with the relevant packet sequence numbers) back to sender 600 to initiate retransmission thereof after receipt of the retransmitted 100th data packet. For this, sender 600 may determine the last packets of the sequence and opportunistically retransmit the last packet to actively solicit a NAK, as discussed above. To generalize, only after receiving the retransmitted leading edge packet (e.g., the 100th packet in FIG. 5), receiver 650 may transmit NAK for the last set of consecutive packets lost (e.g., say, if, data packets 97, 98 and 99 of FIG. 5 are lost).

Upon receipt of NAK related to the 99th packet of FIG. 5, sender 600 may retransmit data packet 99. If all data packets (e.g., packets 1-100 of data packets 170) are determined to be received at receiver 650, receiver 650 may not transmit any NAK to sender 600.

To generalize even more, in one or more embodiments, whenever a data packet corresponding to a sequence number N that is not exactly the data packet corresponding to the last received sequence number (L) plus 1 (or, L+1) is received, receiver 650 may start a timer with a threshold value NAK_TIMEOUT to wait for possible reordered data packets to arrive. The range between L and N may be of interest. The aforementioned scenario may involve three sub-scenarios within NAK_TIMEOUT:

(1) No other packet arrives before NAK_TIMEOUT: Here, receiver 650 may transmit a NAK indicating that packets of range (L+1, N−1) are lost (or, not received).

(2) A data packet belonging to a sequence number M arrives, where L<M<N: Here, receiver 650 may transmit a NAK indicating that packets of range (L+1, M−1) and (M+1, N−1) are lost (or, not received) after NAK_TIMEOUT. In case all data packets between L and N arrive before NAK_TIMEOUT, data packet reception may be considered completed and NAK_TIMEOUT canceled.

(3) A data packet belonging to a sequence number O arrives, where L<N<O, and O is not equal to the last received sequence number after N, which is K, plus 1 (or, K+1): Here, receiver 650 may transmit a NAK indicating that packets of the range (L+1, N−1) and (K+1, O−1) are lost (or, not received after NAK_TIMEOUT).

Figure 7:
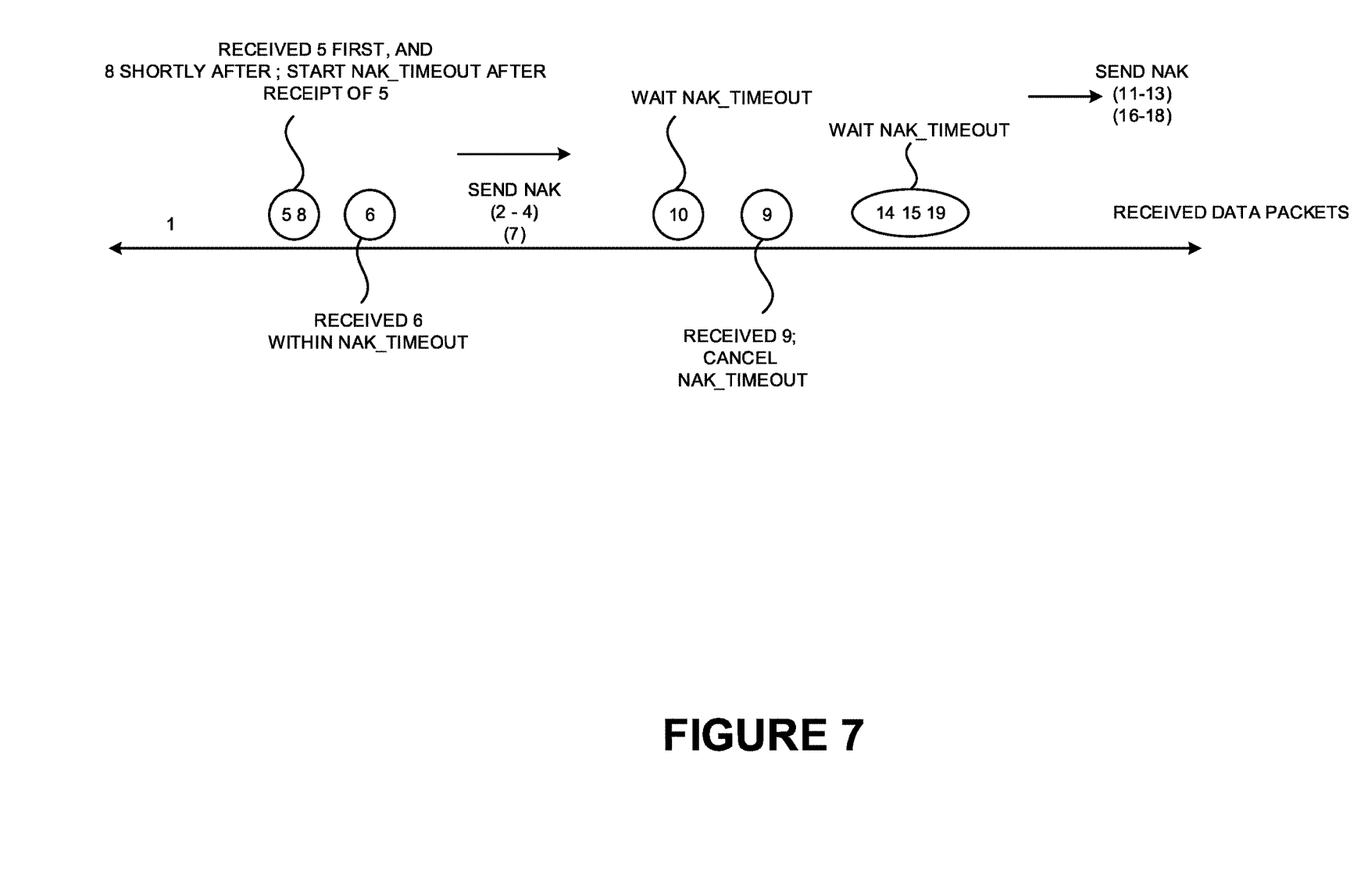
FIG. 7 is an illustrative view of transmission and reception of data packets involving PLR in an example packet sequence.

FIG. 7 illustrates transmission and reception of data packets (e.g., data packets 170) in an example packet sequence. After data packet 1, receiver 650 receives data packet 5 and data packet 8 shortly thereafter. Upon receipt of data packet 5, NAK_TIMEOUT may be started by receiver 650 because L+1=2 is not equal to N (5) to account for an out-of-order arrival of packets. Data packet 6 arrives within NAK_TIMEOUT. In accordance with the description of sub-scenario (3), the receipt of data packet 8 and shortly data 6 thereafter may cause the range of interest to include (L+1, N−1) and (K+1, O−1), where L=1, N=5, O=8 and K=6 (O is not equal to K+1 here); in other words, the range of interest may include data packets 2-4 and 7. After NAK_TIMEOUT, receiver 650 may transmit a NAK to indicate the loss of data packets 2-4 and 7.

As shown in FIG. 7, the next received data packet is packet 10. In accordance therewith, new L=8 and new N=10. The new N is not equal to L+1. Now, receiver 650 may start another NAK_TIMEOUT to wait for possible reordered packets to arrive. Within the new NAK_TIMEOUT, data packet 9 arrives. In accordance with the description of sub-scenario (2), M=9 and L<M<N, and data packet 9 is the only packet to be received between data packet 8 and data packet 10. As a result, NAK_TIMEOUT is canceled.

Now, data packet 14 is received. Upon receipt thereof, receiver 650 may start another NAK_TIMEOUT. Data packets 15 and 19 are received shortly thereafter. The new L is 10 and the new N is 14. The new O is 19 and the new K is 15. If no other data packets are received within the latest NAK_TIMEOUT, in accordance with the description of sub-scenario (3), receiver 650 may transmit a NAK indicating that data packets of the range (L+1, N−1) and (K+1, O−1) are lost. In other words, said NAK may indicate that data packets 11-13 and 16-18 are lost. The process may continue until all data packets are received.

To summarize, in one or more embodiments, sender 600 may store a data packet in retransmit buffer 604 after transmission thereof to receiver 650 along with the sequence identifier (e.g., identifier 652) associated therewith for some time. In one or more embodiments, whenever receiver 650 detects a hole in received packet sequence numbers thereat, receiver 650 may transmit a NAK of one or more missing sequence numbers to sender 600 after a short wait for possible reordering. In one or more embodiments, upon receipt of the NAK, sender 600 may look up the one or more missing/lost sequence numbers from retransmit buffer 604 and retransmit the relevant data packets to receiver 650. In one or more embodiments, in a perfect link without loss, no feedback may come from receiver 650 and data packets (e.g., copied data packets 620) in retransmit buffer 604 may be removed after a predetermined timeout.

In one or more embodiments, receiver 650 may be able to detect missing sequence numbers only after reception of data packets of larger sequence numbers than what receiver 650 is expecting. Therefore, it may be impossible for receiver 650 to detect the loss of the last data packet or the last continuous sets of data packets in a stream. In one or more embodiments, to solve the aforementioned problem, sender 600 may opportunistically retransmit the last packet of the stream so that receiver 650 can recover the last data packet and send out a NAK for any additional sequence numbers that are lost.

It should be noted that although exemplary embodiments find use in UDP based data packet transmission, concepts associated therewith may be extended to any form of communication protocols to optimally increase reliability thereof. In the case of UDP based communication, data traffic in "long-haul" (e.g., using intercontinental WAN) enterprise networks may suffer a great deal from loss and jitter. In one or more embodiments, PLR implemented through PLR policy 414 and feedback protocol 500 may add a layer of reliability to UDP or other forms of communication protocols while reducing "long-haul" wait times for recovery, especially when layered on top of multi-segment POP-POP architecture 300. In one or more embodiments, again, PLR may offer the aforementioned advantages with minimal bandwidth overhead.

It should be noted that the combination of sender 600 and receiver 650 may be any combination of servers $112_{1-M}$, data processing device $114_{1-N}$, POP 116, POPs $116_{1-N}$, CPE 120 and CPEs $120_{1-N}$. PLR/feedback protocol 500 may be implemented through hardware, software and/or a combination thereof and operations discussed above executed through sender 600 and receiver 650 based on processing capabilities (see, e.g., FIG. 2) provided therein. Also, in one or more embodiments, PLR policy 414/PLR/feedback protocol 500 and/or instructions associated with the operations/processes discussed above may be tangibly embodied in a non-transitory medium readable through a data processing device (e.g., servers $112_{1-M}$, data processing device $114_{1-N}$, POP 116, POPs $116_{1-N}$, CPE 120, CPEs $120_{1-N}$) and executable therethrough.

It should be noted that POPs and/or CPEs of multi-segment POP-POP architecture 300 may be able to determine lossiness of data packets 170 therethrough and dynamically enable incorporation of PLR/PLR policy 414/feedback protocol 500. Exemplary embodiments are applicable to both a single segment of computing communication system 100 and any number of segments of multi-segment POP-POP architecture 300.

Figure 8:
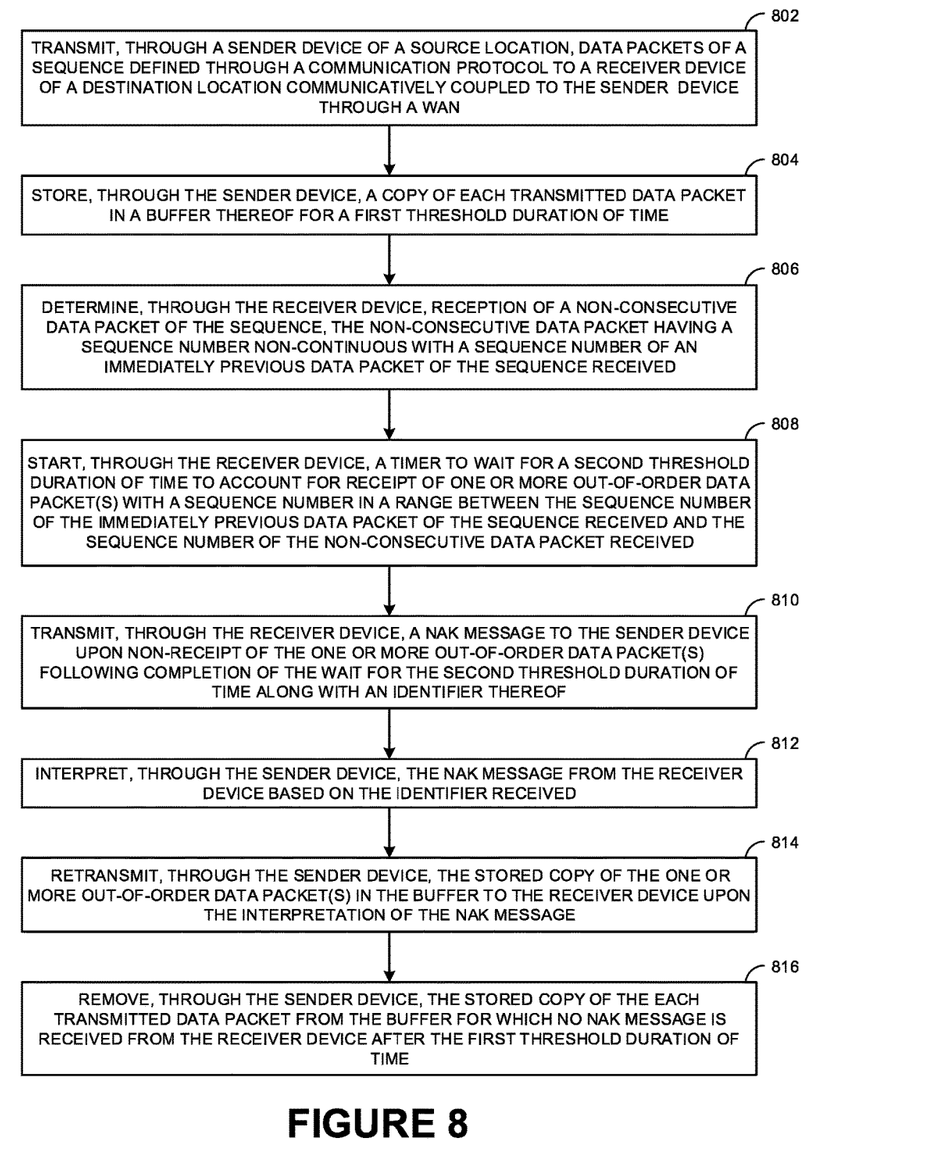
FIG. 8 is a process flow diagram detailing the operations involved in reducing data bandwidth overload in a protocol based communication over a WAN, according to one or more embodiments Other features of the present embodiments will be apparent from accompanying drawings and from the detailed description that follows.

FIG. 8 shows a process flow diagram detailing the operations involved in reducing data bandwidth overload in a protocol based communication over a WAN (e.g., WAN 106, WAN $106_{1-N}$), according to one or more embodiments. In one or more embodiments, operation 802 may involve transmitting, through a sender device (e.g., sender 600) of a source location (e.g., source location 102), data packets (e.g., data packets 170) of a sequence defined through a communication protocol to a receiver device (e.g., receiver 650) of a destination location (e.g., destination location $104_{1-N}$) communicatively coupled to the sender device through the WAN. In one or more embodiments, the sender device may be a server (e.g., server $112_{1-M}$), a data processing device (e.g., data processing device $114_{1-N}$), a POP (e.g., POP 116, POPs $116_{1-N}$) location of a computing system (e.g., computing communication system 100), and a CPE (e.g., CPE 120, CPE $120_{1-N}$) associated with the source location.

The receiver device is another server (e.g., server $112_{1-M}$), another data processing device (e.g., data processing device $114_{1-N}$), another POP (e.g., POP 116, POPs $116_{1-N}$) location of the computing system or another CPE (e.g., CPE 120, CPE $120_{1-N}$) associated with the destination location. In one or more embodiments, operation 804 may involve storing, through the sender device, a copy of each transmitted data packet in a buffer (e.g., retransmit buffer 604) thereof for a first threshold duration of time (e.g., TX_PKT_BUFFER_TIMEOUT). In one or more embodiments, operation 806 may involve determining, through the receiver device, reception of a non-consecutive data packet of the sequence. In one or more embodiments, the non-consecutive data packet having a sequence number non-continuous with a sequence number of an immediately previous data packet of the sequence received.

In one or more embodiments, operation 808 may involve starting, through the receiver device, a timer to wait for a second threshold duration of time (e.g., NAK_TIMEOUT) to account for receipt of one or more out-of-order data packet(s) with a sequence number in a range between the sequence number of the immediately previous data packet of the sequence received and the sequence number of the non-consecutive data packet received. In one or more embodiments, operation 810 may involve transmitting, through the receiver device, a NAK message to the sender device upon non-receipt of the one or more out-of-order data packet(s) following completion of the wait for the second threshold duration of time along with an identifier thereof.

In one or more embodiments, operation 812 may involve interpreting, through the sender device, the NAK message from the receiver device based on the identifier received. In one or more embodiments, operation 814 may involve retransmitting, through the sender device, the stored copy of the one or more out-of-order data packet(s) in the buffer to the receiver device upon the interpretation of the NAK message. In one or more embodiments, operation 816 may then involve removing, through the sender device, the stored copy of the each transmitted data packet from the buffer for which no NAK message is received from the receiver device after the first threshold duration of time.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., computing communication system 100, multi-segment POP-POP architecture 300, data processing device 114$_{1-N}$, servers 112$_{1-M}$, CPE 120, CPE 120$_{1-N}$, POP 116, POPs 116$_{1-N}$), and may be performed in any order (e.g., including using means for achieving the various operations). Accordingly, the specification and drawings are to be regarded in an illustrative rather than a restrictive sense.

What is claimed is:

1. A method comprising:
communicating, between a sender device of a source location and a receiver device of a destination location, data packets of a sequence defined through a communication protocol in at least one segment of a multi-segment Point of Presence (POP)-POP architecture of a computer communication system, the sender device and the receiver device being communicatively coupled to one another through a Wide Area Network (WAN), the sender device being one of: a server, a data processing device, a POP location of the multi-segment POP-POP architecture, and a Customer Premise Equipment (CPE) associated with the source location, and the receiver device being one of: another server, another data processing device, another POP location of the multi-segment POP-POP architecture, and another CPE associated with the destination location; and implementing, on top of WAN optimization and application acceleration provided between the sender device and the receiver device related to the communication of the data packets, a feedback mechanism between the sender device and the receiver device to determine an exact subset of the data packets lost during transmission thereof from the sender device to the receiver device and to solely retransmit the exact subset of the data packets lost from the sender device to the receiver device in order to improve reliability of the communication protocol in the communication of the data packets while reducing data bandwidth overhead to a fraction of a total data bandwidth equal to a percentage of the data packet loss during the communication of the data packets, the feedback mechanism comprising:

storing, through the sender device, a copy of each transmitted data packet in a buffer thereof for a first threshold duration of time;

determining, through the receiver device, reception of a non-consecutive data packet of the sequence, the non-consecutive data packet having a sequence number non-continuous with a sequence number of an immediately previous data packet of the sequence received;

starting, through the receiver device, a timer to wait for a second threshold duration of time to account for receipt of at least one out-of-order data packet with a sequence number in a range between the sequence number of the immediately previous data packet of the sequence received and the sequence number of the non-consecutive data packet received;

transmitting, through the receiver device, a Negative Acknowledgement (NAK) message to the sender device upon non-receipt of the at least one out-of-order data packet following completion of the wait for the second threshold duration of time along with an identifier thereof;

interpreting, through the sender device, the NAK message from the receiver device based on the identifier received;

retransmitting, through the sender device, the stored copy of the at least one out-of-order data packet in the buffer to the receiver device upon the interpretation of the NAK message; and removing, through the sender device, the stored copy of the each transmitted data packet from the buffer for which no NAK message is received from the receiver device after the first threshold duration of time.

2. The method of claim 1, wherein the feedback mechanism further comprises:
opportunistically retransmitting, through the sender device, a last data packet of the sequence to actively solicit a NAK message therefor from the receiver device upon:
the sender device not transmitting any data packet to the receiver device in a third threshold duration of time, and
the sender device not receiving any NAK message from the receiver device in the third threshold duration of time.

3. The method of claim 1, wherein when the sequence number of the non-consecutive data packet received is N, the sequence number of the immediately previous data packet of the sequence received is L, and N is not equal to L+1, the feedback mechanism comprises:
transmitting, through the receiver device, the NAK message to the sender device upon the non-receipt of the at least one out-of-order data packet following the completion of the wait for the second threshold duration of time along with an identifier of a range of data packet sequence numbers (L+1, N−1) associated with the at least one out-of-order data packet;

in response to receipt of a data packet with sequence number M within the second threshold duration of time, and L<M<N, transmitting, through the receiver device, the NAK message to the sender device upon non-receipt of any other of the at least one out-of-order data packet following the completion of the wait for the second threshold duration of time along with an identifier of ranges of data packet sequence numbers, (L+1, M−1) and (M+1, N−1), associated with the non-received any other of the at least one out-of-order data packet; and in response to receipt of a data packet with sequence number O within the second threshold duration of time, L<N<O, a last received sequence number of a data packet after N is K, and O is not equal to K+1, transmitting, through the receiver device, the NAK message to the sender device upon non-receipt of any other of the at least one out-of-order data packet following the completion of the wait for the second threshold duration of time along with an identifier of ranges of data packet sequence numbers, (L+1, N−1) and (K+1, O−1) associated with the non-received any other of the at least one out-of-order data packet.

4. The method of claim 2, wherein the feedback mechanism further comprises transmitting, through the receiver device, a NAK message for a last at least one consecutive data packet immediately preceding in sequence number that of the opportunistically retransmitted last data packet only after receipt of the opportunistically retransmitted last data packet at the receiver device.

5. The method of claim 1, comprising implementing the feedback mechanism as a feedback protocol.

6. The method of claim 1, further comprising defining the operations associated with the feedback mechanism as policy in the multi-segment POP-POP architecture.

7. The method of claim 1, wherein the communication protocol is User Datagram Protocol (UDP).

8. A computing system with a multi-segment POP-POP architecture comprising:
  a sender device of a source location, the sender device being one of: a server, a data processing device, a POP location of the multi-segment POP-POP architecture, and a CPE associated with the source location; and
  a receiver device of a destination location communicatively coupled to the sender device through a WAN, the receiver device being one of: another server, another data processing device, another POP location of the multi-segment POP-POP architecture and another CPE associated with the destination location,
  wherein data packets of a sequence defined through a communication protocol in at least one segment of the multi-segment POP-POP architecture are communicated between the sender device and the receiver device,
  wherein, on top of WAN optimization and application acceleration provided between the sender device and the receiver device related to the communication of the data packets, a feedback mechanism is implemented between the sender device and the receiver device to determine an exact subset of the data packets lost during transmission thereof from the sender device to the receiver device and to solely retransmit the exact subset of the data packets lost from the sender device to the receiver device in order to improve reliability of the communication protocol in the communication of the data packets while reducing data bandwidth overhead to a fraction of a total data bandwidth equal to a percentage of the data packet loss during the communication of the data packets, and
  wherein, in accordance with the feedback mechanism:
    the sender device is configured to:
      store a copy of each transmitted data packet in a buffer for a first threshold duration of time,
    the receiver device is configured to:
      determine reception of a non-consecutive data packet of the sequence, the non-consecutive data packet having a sequence number non-continuous with a sequence number of an immediately previous data packet of the sequence received,
      start a timer to wait for a second threshold duration of time to account for receipt of at least one out-of-order data packet with a sequence number in a range between the sequence number of the immediately previous data packet of the sequence received and the sequence number of the non-consecutive data packet received, and
      transmit a NAK message to the sender device upon non-receipt of the at least one out-of-order data packet following completion of the wait for the second threshold duration of time along with an identifier thereof, and
    the sender device is further configured to:
      interpret the NAK message from the receiver device based on the identifier received,
      retransmit the stored copy of the at least one out-of-order data packet in the buffer to the receiver device upon the interpretation of the NAK message, and
      remove the stored copy of the each transmitted data packet from the buffer for which no NAK message is received from the receiver device after the first threshold duration of time.

9. The computing system of claim 8, wherein, in accordance with the feedback mechanism:
  the server is further configured to opportunistically retransmit a last data packet of the sequence to actively solicit a NAK message therefor from the receiver device upon:
    the sender device not transmitting any data packet to the receiver device in a third threshold duration of time,
    the sender device not receiving any NAK message from the receiver device in the third threshold duration of time.

10. The computing system of claim 8, wherein, in accordance with the feedback mechanism, when the sequence number of the non-consecutive data packet received is N, the sequence number of the immediately previous data packet of the sequence received is L, and N is not equal to L+1:
  the receiver device is further configured to transmit the NAK message to the sender device upon the non-receipt of the at least one out-of-order data packet following the completion of the wait for the second threshold duration of time along with an identifier of a range of data packet sequence numbers (L+1, N−1) associated with the at least one out-of-order data packet,
  in response to receipt of a data packet with sequence number M within the second threshold duration of time, and L<M<N, the receiver device is further configured to transmit the NAK message to the sender device upon non-receipt of any other of the at least one out-of-order data packet following the completion of the wait for the second threshold duration of time along with an identifier of ranges of data packet sequence numbers, (L+1, M−1) and (M+1, N−1), associated with the non-received any other of the at least one out-of-order data packet, and
  in response to receipt of a data packet with sequence number O within the second threshold duration of time, L<N<O, a last received sequence number of a data packet after N is K, and O is not equal to K+1, the receiver device is further configured to transmit the NAK message to the sender device upon non-receipt of any other of the at least one out-of-order data packet following the completion of the wait for the second threshold duration of time along with an identifier of ranges of data packet sequence numbers, (L+1, N−1) and (K+1, O−1) associated with the non-received any other of the at least one out-of-order data packet.

11. The computing system of claim 9, wherein, in accordance with the feedback mechanism, the receiver device is further configured to transmit a NAK message for a last at least one consecutive data packet immediately preceding in sequence number that of the opportunistically retransmitted last data packet only after receipt of the opportunistically retransmitted last data packet at the receiver device.

12. The computing system of claim 8, wherein the feedback mechanism is implemented as a feedback protocol.

13. The computing system of claim 8, wherein the operations associated with the feedback mechanism implemented are defined as policy in the multi-segment POP-POP architecture.

14. The computing system of claim 8, wherein the communication protocol is UDP.

15. A non-transitory medium, readable through a sender device of a source location and a receiver device of a destination location communicatively coupled to the sender device through a WAN in at least one segment of a multi-segment POP-POP architecture of a computer communication system and comprising instructions embodied therein that are executable through the sender device and the receiver device, the sender device being one of: a server, a data processing device, a POP location of the multi-segment POP-POP architecture, and a CPE associated with the source location, the receiver device being one of: another server, another data processing device, another POP location of the multi-segment POP-POP architecture, and another CPE associated with the destination location, and the non-transitory medium comprising:

instructions to communicate between the sender device and the receiver device, data packets of a sequence defined through a communication protocol in the at least one segment of the multi-segment POP-POP architecture; and instructions to implement, on top of WAN optimization and application acceleration provided between the sender device and the receiver device related to the communication of the data packets, a feedback mechanism between the sender device and the receiver device to determine an exact subset of the data packets lost during transmission thereof from the sender device to the receiver device and to solely retransmit the exact subset of the data packets lost from the sender device to the receiver device in order to improve reliability of the communication protocol in the communication of the data packets while reducing data bandwidth overhead to a fraction of a total data bandwidth equal to a percentage of the data packet loss during the communication of the data packets, the instructions to implement the feedback mechanism comprising:

instructions to store, through the sender device, a copy of each transmitted data packet in a buffer thereof for a first threshold duration of time;

instructions to determine, through the receiver device, reception of a non-consecutive data packet of the sequence, the non-consecutive data packet having a sequence number non-continuous with a sequence number of an immediately previous data packet of the sequence received;

instructions to start, through the receiver device, a timer to wait for a second threshold duration of time to account for receipt of at least one out-of-order data packet with a sequence number in a range between the sequence number of the immediately previous data packet of the sequence received and the sequence number of the non-consecutive data packet received;

instructions to transmit, through the receiver device, a NAK message to the sender device upon non-receipt of the at least one out-of-order data packet following completion of the wait for the second threshold duration of time along with an identifier thereof;

instructions to interpret, through the sender device, the NAK message from the receiver device based on the identifier received;

instructions to retransmit, through the sender device, the stored copy of the at least one out-of-order data packet in the buffer to the receiver device upon the interpretation of the NAK message; and instructions to remove, through the sender device, the stored copy of the each transmitted data packet from the buffer for which no NAK message is received from the receiver device after the first threshold duration of time.

16. The non-transitory medium of claim 15, wherein the instructions to implement the feedback mechanism further comprise:

instructions to opportunistically retransmit, through the sender device, a last data packet of the sequence to actively solicit a NAK message therefor from the receiver device upon:

the sender device not transmitting any data packet to the receiver device in a third threshold duration of time, and the sender device not receiving any NAK message from the receiver device in the third threshold duration of time.

17. The non-transitory medium of claim 15, wherein when the sequence number of the non-consecutive data packet received is N, the sequence number of the immediately previous data packet of the sequence received is L, and N is not equal to L+1, the instructions to implement the feedback mechanism comprise:

instructions to transmit, through the receiver device, the NAK message to the sender device upon the non-receipt of the at least one out-of-order data packet following the completion of the wait for the second threshold duration of time along with an identifier of a range of data packet sequence numbers (L+1, N−1) associated with the at least one out-of-order data packet;

in response to receipt of a data packet with sequence number M within the second threshold duration of time, and L<M<N, instructions to transmit, through the receiver device, the NAK message to the sender device upon non-receipt of any other of the at least one out-of-order data packet following the completion of the wait for the second threshold duration of time along with an identifier of ranges of data packet sequence numbers, (L+1, M−1) and (M+1, N−1), associated with the non-received any other of the at least one out-of-order data packet; and in response to receipt of a data packet with sequence number O within the second threshold duration of time, L<N<O, a last received sequence number of a data packet after N is K, and O is not equal to K+1, instructions to transmit, through the receiver device, the NAK message to the sender device upon non-receipt of any other of the at least one out-of-order data packet following the completion of the wait for the second threshold duration of time along with an identifier of ranges of data packet sequence numbers, (L+1, N−1) and (K+1, O−1) associated with the non-received any other of the at least one out-of-order data packet.

18. The non-transitory medium of claim 16, wherein the instructions to implement the feedback mechanism further comprise instructions to transmit, through the receiver device, a NAK message for a last at least one consecutive data packet immediately preceding in sequence number that of the opportunistically retransmitted last data packet only after receipt of the opportunistically retransmitted last data packet at the receiver device.

19. The non-transitory medium of claim 15, comprising instructions to implement the feedback mechanism as a feedback protocol.

20. The non-transitory medium of claim 15, further comprising instructions to define the operations associated with the feedback mechanism implemented as policy in the multi-segment POP-POP architecture.

* * * * *